United States Patent Office
3,330,502
Patented July 11, 1967

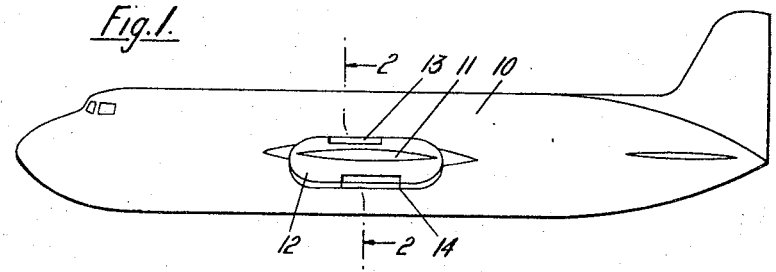
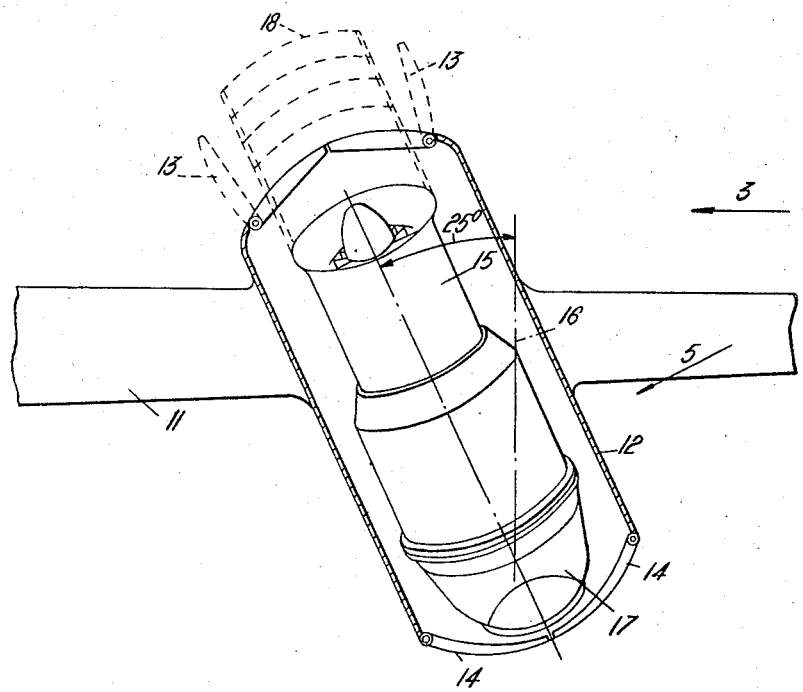

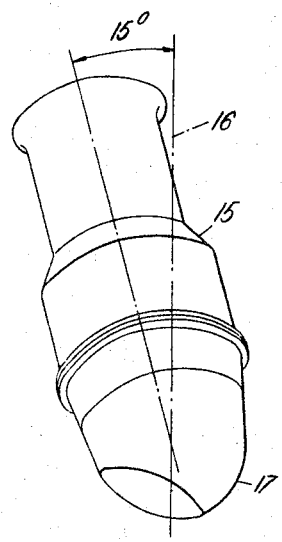
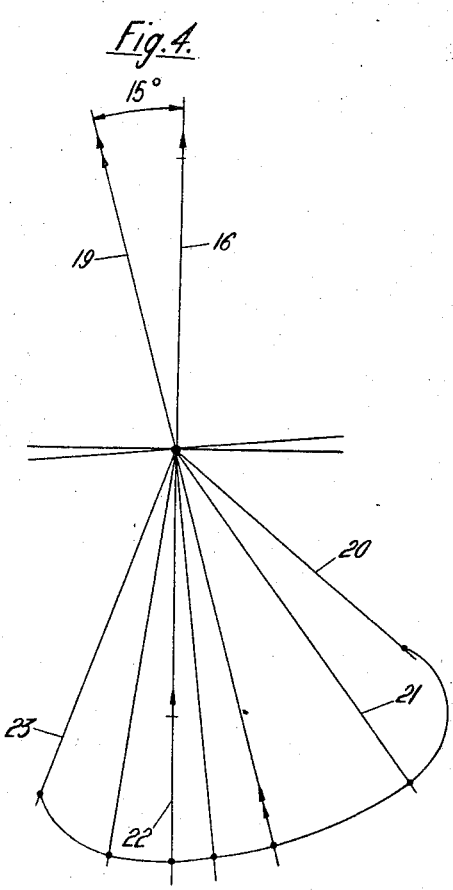

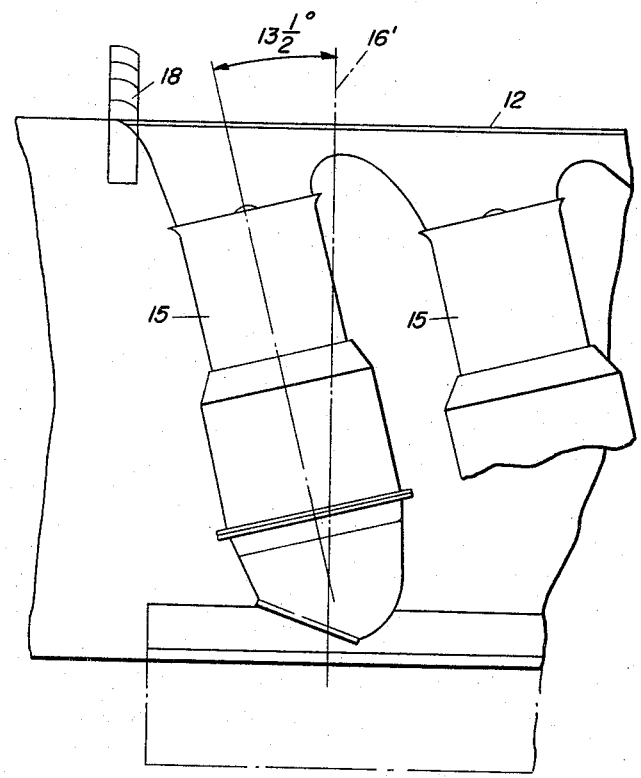

3,330,502
AIRCRAFT
Francis Jeffrey Colville, Sutton-in-Ashfield, England, assignor to Rolls-Royce Limited, Derby, England, a British company
Filed Sept. 17, 1965, Ser. No. 488,209
Claims priority, application Great Britain, Oct. 10, 1964, 41,442/64
4 Claims. (Cl. 244—55)

ABSTRACT OF THE DISCLOSURE

An aircraft has a number of turbo-jet direct lift engines mounted in, for example, a wing pod, so that the longitudinal axis of each engine is inclined to the yaw axis of the aircraft both in the pitching and rolling plane of the aircraft. Each engine has a rotatable jet deflector nozzle so that the resultant direction of the jet thrust of the or each engine may be varied by rotation of the respective deflector nozzle about the longitudinal axis of the engine. By virtue of the fixed tilt of each engine, the resultant thrust may in this way be directed downwardly, rearwardly, forwardly or laterally as required.

---

This invention comprises improvements in or relating to aircraft.

Throughout this specification the term "lift engine" is to be understood to refer to an engine or jet nozzle or turbo-fan adapted to produce direct lift on an aircraft independently of lift produced by aerodynamic surfaces.

According to this invention an aircraft has at least one lift engine mounted therein, the or each said lift engine being mounted so that the longitudinal axis thereof has a substantial inclination with respect to the yaw axis of the aircraft both in the pitching and rolling plane of the aircraft.

Each of the lift engines may be provided with a deflector nozzle to deflect the exhaust gases at a predetermined angle with respect to the longitudinal axis of the engine, the nozzle being rotatable about the said axis.

Preferably the angles of inclination of the longitudinal axis of the engine and the said predetermined deflection angle of the nozzle are chosen so that the resultant direction of the thrust of the engine may be varied by rotation of the deflector about said longitudinal axis so as to be alternatively substantially parallel to the yaw axis of the aircraft or to have a rearward or forward component, or to be at a small angle to the ground for ground running.

Preferably said engine comprises a turbo-jet engine.

The invention will be described, merely by way of example, with reference to the accompanying drawings, in which:

FIGURE 1 is a side elevation of the aircraft according to the invention,

FIGURE 2 is a section on the line 2—2 of FIGURE 1 through an engine pod,

FIGURE 3 is a view on the arrow 3 of FIGURE 2 of an engine in said pod,

FIGURE 4 is a diagram showing the available thrust vectors with the engine as shown in FIGURE 3, FIGURE 5 is a cut-away view on the arrow 5 of FIGURE 2 of part of an engine pod.

Figure 6:
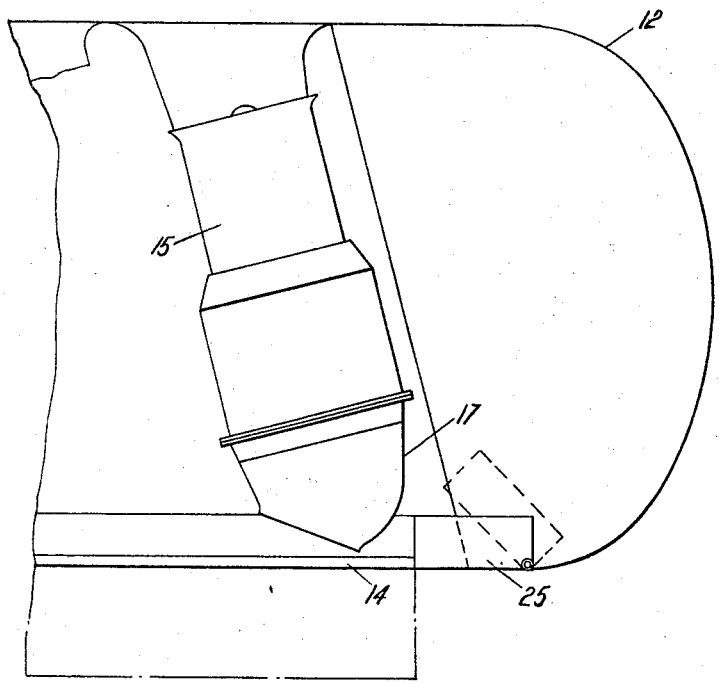
FIGURE 6 is a view similar to FIGURE 5 of the rear end of a pod.

FIGURE 1 shows an aircraft 10 having wings 11 in each of which there is carried a pod 12. The pod 12 has upper and lower doors 13 and 14 and when these doors are opened, they expose the upper and lower ends respectively of a plurality of engines 15. The doors 13, 14, housed in the pod 12, provide streamlining of the pod 12 when the engines 15 are not in use. As can be seen from FIGURE 2, which is a section taken in the rolling plane of the aircraft 10, the pod 12 is set at an angle to the yaw axis of the aircraft 10, the direction of which is indicated by a broken line 16. In the drawings each engine 15 is shown as having its upper end tilted inboard at an angle of 25 degrees. With the aircraft 10 level as shown in the drawings, the line 16 is, of course, vertical.

Each engine 15 has at its outlet end a jet deflector nozzle 17 which is rotatable about the longitudinal axis of the engine 15 by means not shown.

FIGURE 3 shows an engine 15 viewed in the direction of the arrow 3 of FIGURE 2, that is, in the pitching plane of the aircraft 10. The line 16 again indicates the direction of the yaw axis of the aircraft 10 and it will be seen that the longitudinal axis of each engine 15 is tilted with its upper end inclined forwardly with respect to the aircraft 10. In the embodiment shown the longitudinal axis of each engine 15 makes an angle in the plane of FIGURE 3 (i.e., the pitching plane) of 15 degrees with the yaw axis 16.

The deflector nozzle 17 can be seen more clearly in FIGURE 3 and it will be noted that it gives a constant angle of deflection but that the direction of the deflected jet gases can be rotated through 360 degrees about the engine axis by rotation of the deflector nozzle 17. In the case shown the angle of deflection provided by the deflector nozzle 17 is 32½ degrees with respect to the longitudinal axis of the engine 15.

It will be seen from FIGURES 2 and 3 that each engine 15 is given a compound tilt with respect to the axis shown by line 16, that is, it is tilted with its upper end inboard by virtue of the tilt of the pod 12 and it is tilted with its upper end forward by virtue of the tilt of the engine 15 within the pod 12.

FIGURE 5 shows a pair of engines 15 viewed normal to the plane of the pod 12 when it can be seen that the engines 15 are at a true angle of 13½ degrees with respect to the line 16' which is the projection of the yaw axis 16 on to the plane containing the longitudinal axes of the engines 15, that is, the plane of FIGURE 5. There is also shown in FIGURE 5 a set of retractable deflector vanes 18 which serve to deflect air into the intakes of the engines 15 when the aircraft 10 is moving forward and the doors 13 are open, as indicated by broken lines in FIGURE 2.

FIGURE 4 shows diagrammatically the various directions in which the thrust from a respective engine 15 may be vectored by rotation of the respective deflector nozzle 17 about the longitudinal axis of the engine 15. In addition to the line 16 representing the direction of the yaw axis of the aircraft 10, a line 19 is indicated, representing the longitudinal axis of the engine 15. The plane of FIGURE 4 is the same as that of FIGURE 3. Four directions of the vectored thrust of the engine 15 are shown, by means of lines 20, 21, 22 and 23.

With the deflector nozzle 17 producing thrust in the direction of the line 20 the resultant thrust is inclined at an angle of 50 degrees to the vertical in the fore and aft direction, that is, in the pitching plane of the aircraft 10, and at an angle of 49 degrees to the vertical in the outboard direction, that is, in the rolling plane of the aircraft 10. The resultant thrust is therefore inclined at 59 degrees to the vertical and thus, owing to the thrust from the engine 15 being at a considerable angle to the ground, this position is useful for ground running, when it is required that the ground beneath the aircraft should not be directly impinged on by the exhaust gases.

By moving the deflector nozzle 17 through an angle in the clockwise direction when viewed from underneath the efflux of gases may be directed as shown by the line 21. In this position the thrust is at an angle of 36 degrees to the vertical in the fore and aft direction and this enables 58% of the thrust of the engine 15 to be used for forward propulsion of the aircraft 10. Additionally, 81% of the thrust of the engine 15 is available in a vertical direction to produce direct lift with no outboard or inboard components.

A further rotation of the deflector nozzle 17 in the same sense brings the thrust vector to the position indicated by line 22. In this position the thrust is vertical in the fore and aft direction but has a 5 degree inboard tilt. This tilt is, however, cancelled out by similar but opposite tilt of the engines 15 in a similar pod 12 (not shown) on the other wing.

Thus 99.6% of the entire thrust of the engine is available as direct vertical lift to assist the aircraft 10 in vertical take-off or landing.

Further rotation of the deflector nozzle 17 brings the thrust vector to the position shown by the line 23. In this position the thrust acts at an angle of 21 degrees forward of the vertical and 25 degrees outboard. This combination enables 32½% of the thrust of the engines 15 to be used for reverse thrust when landing the aircraft 10, whilst 85½% of engine thrust is available as direct lift. The outboard angle of the jet gases assists in preventing re-ingestion of the exhaust gases into the intakes of the engines 15.

In FIGURE 6 there is shown a side view of the rear extremity of the pod 12 of FIGURE 5. The engines 15 are disposed in a similar fashion to those of FIGURE 5. The longitudinally extending doors 14 blank off most of the bottom of the pod 12 when the engines 15 are not in use, the doors 14 being opened to provide a passage for the exhaust gases from the engines 15 when the latter are in use, as indicated by broken lines. At the rear extremity of the doors 14 there is an additional inwardly opening door 25 which is hinged at its rear end and hinges into the pod 12, as shown in broken lines so as to clear the exhaust gases from the engine 15 when the deflector nozzle 17 is deflecting gases in a rearward direction.

The angles refererd to above are all with reference to the yaw axis of the aircraft 10, which coincides with the vertical when the aircraft 10 is level. If the aircraft 10 is in flight the aircraft will take up an angle of incidence which may be of the order of 6 degrees to the horizontal and the angles referred to above will differ slightly from the angles with respect to the vertical. This obviously applies when the aircraft 10 is coming into land. It will be understood that the angles quoted above are by way of example only and may be altered for different applications.

It will be seen that by providing the engines 15 with a compound tilt, that is, an inclination in both the pitching and rolling planes with respect to the yaw axis of the aircraft 10 according to the invention, it is possible by the use of a simple fixed angle swivelling deflector nozzle 17 to provide a good combination of thrust vectors for a vertical or short take-off and landing aircraft. Thus the deflector nozzle 17 need only be of relatively small deflection angle and hence low losses, while compound tilt of the engines 15 enables the simple deflector nozzle 17 to provide not only all the thrust vectors necessary for take-off and landing, but also to provide a ground-running position which would normally require the use of a further deflector means.

Although the aircraft 10 as shown is provided only with the engines 15, it is, of course, quite possible to provide, in addition, independent conventional forward propulsion engines which may act also as lift engines in additions to the engines 15. Again, although the pods 12 are shown as having only two engines 15 each there may be more or less engines 15 in each pod 12, depending on the total thrust required.

I claim:
1. An aircraft having mounted therein at least one turbo-jet direct lift engine, a rotatable jet deflector nozzle mounted on each respective lift engine, each said engine being mounted in a fixed position so that the longiudinal axis thereof has a substantial inclination with respect to the yaw axis of the aircraft both in the pitching and rolling plane of the aircraft, and means for rotating each respective deflector nozzle about the longitudinal axis of the respective engine so that the resultant jet thrust thereof may be directed alternatively substantially parallel to the yaw axis of the aircraft, rearwardly, forwardly and laterally with respect to the aircraft as required.

2. An aircraft as claimed in claim 1 having a wing-mounted pod, and a plurality of said lift engines housed in said pod, in which the engines are mounted in the pod with their longitudinal axes parallel to each other, and each engine has a respective air intake and a respective exhaust outlet, the respective air intakes being disposed above and forwardly of the respective exhaust outlets.

3. An aircraft as claimed in claim 2 in which the pod is provided with respective upper and lower doors adapted, when the engines are inoperative, to be closed, to form an areodynamic cover for the engine intakes and exhaust outlets respectively and, when the engines are in use, to be open to expose said intakes and exhausts, and in which an additional inwardly opening door is provided at a longitudinal extremity of the lower doors, said inwardly opening door being adapted to form an aerodynamic cover for part of the pod when the engines are inoperative and to be withdrawn clear of the exhaust gases when the engines are in use.

4. An aircraft as claimed in claim 3 wherein retractable guide vane means are provided adjacent the air intakes of the engines, said guide vane means being operative, when the upper doors of the pod are open, to deflect air into said engine air intakes.

References Cited

UNITED STATES PATENTS

| | | | |
|---|---|---|---|
| 2,936,969 | 5/1960 | Griffith et al. | 244—55 X |
| 3,216,675 | 11/1965 | Snell | 244—52 X |
| 3,273,829 | 9/1966 | Elstone | 244—54 |

FOREIGN PATENTS 993,731  6/1965  Great Britain.

MILTON BUCHLER, *Primary Examiner.*
B. BELKIN, *Assistant Examiner.*